(12) United States Patent
Pacino, II (10) Patent No.: US 12,277,239 B2
(45) Date of Patent: Apr. 15, 2025

(54) PROTECTIVE DEACTIVATION OF GDPR WALLET

(71) Applicant: HealthCarePoint.com Corporation, Austin, TX (US)

(72) Inventor: Alcides O. Pacino, II, Cedar Park, TX (US)

(73) Assignee: HealthCarePoint.com Corporation, Austin, TX (US)

( * ) Notice: Subject to any disclaimer, the term of this patent is extended or adjusted under 35 U.S.C. 154(b) by 290 days.

(21) Appl. No.: 17/845,696

(22) Filed: Jun. 21, 2022

(65) Prior Publication Data
US 2023/0409720 A1    Dec. 21, 2023

(51) Int. Cl.
*G06F 21/30* (2013.01)
*G06F 21/50* (2013.01)
*G06F 21/62* (2013.01)

(52) U.S. Cl.
CPC .............. *G06F 21/62* (2013.01); *G06F 21/30* (2013.01); *G06F 21/50* (2013.01); *G06F 2221/2143* (2013.01)

(58) Field of Classification Search
CPC .. G06F 21/62; G06F 21/50; G06F 2221/2143; G06F 21/30
USPC ......................................................... 726/30
See application file for complete search history.

(56) References Cited

U.S. PATENT DOCUMENTS

| | | |
|---|---|---|
| 10,713,742 B1 | 7/2020 | Pacino |
| 10,812,455 B1 | 10/2020 | Reissner et al. |
| 10,839,099 B2 * | 11/2020 | Vogel .................. G06F 21/6245 |
| 11,062,036 B2 | 7/2021 | Youssefi et al. |
| 11,106,813 B2 * | 8/2021 | Gkoulalas-Divanis ...................... G06F 21/6218 |
| 11,151,280 B2 * | 10/2021 | Saad ..................... G06F 16/162 |
| 11,157,643 B2 * | 10/2021 | Malliah ............... H04W 12/084 |
| 11,182,491 B2 | 11/2021 | Goldsteen et al. |
| 11,182,498 B2 | 11/2021 | Veltman et al. |
| 11,188,676 B2 | 11/2021 | Sellberg et al. |
| 11,194,919 B2 | 12/2021 | Karia et al. |
| 2018/0068131 A1 * | 3/2018 | Bronkalla ........... G06F 21/6245 |

(Continued)

OTHER PUBLICATIONS

Richard-Reitzner-Allee; Data Protection; Weka Fachmedien ; Year: 2020; pp. 1-9.*

(Continued)

*Primary Examiner* — Monjur Rahim
(74) *Attorney, Agent, or Firm* — Jack V. Musgrove (57) ABSTRACT

A credential management system stores GDPR wallets of individuals who consent to share their private data with various consumers, and constructs GDPR directories for the consumers allowing access to the wallet records. If an individual decides they no longer want to share their records with a specific consumer, the system deactivates access to the specific consumer for compliance with privacy laws. However, the consumer may have a legitimate need to retain the information in which case the system will still allow access to records that were available prior to deactivation, but will block access to any newly added records in the individual's wallet. An individual may also automatically deactivate all current consumer connections; if this global deactivation happens after a specific consumer has been already been deactivated, the system will use two different deactivation dates for the access filter depending on which consumer is attempting to view the wallet.

16 Claims, 9 Drawing Sheets

(56) References Cited

U.S. PATENT DOCUMENTS

| | | |
|---|---|---|
| 2019/0253431 A1 | 8/2019 | Atanda |
| 2020/0104521 A1* | 4/2020 | Malliah .................. G06F 16/90 |
| 2020/0117824 A1 | 4/2020 | Upadhyay et al. |
| 2020/0387625 A1* | 12/2020 | Saad ................... G06F 21/6227 |
| 2021/0073736 A1* | 3/2021 | Alawi .............. G06Q 10/06315 |
| 2021/0075794 A1* | 3/2021 | Gazit ................. H04L 63/1408 |
| 2021/0210160 A1* | 7/2021 | Shelton ................. G16B 20/20 |
| 2021/0218742 A1* | 7/2021 | Cook ...................... G06F 21/31 |
| 2021/0390207 A1 | 12/2021 | Veltman et al. |

OTHER PUBLICATIONS

The European Parliament and the Council of the European Union, "Regulation (EU) 2016/679 (General Data Protection Regulation)", Official Journal of the European Union, v. 59 (2016).

* cited by examiner

GDPR Wallet Record

Record Owner: John A. Smith

Owner ID: JSmith#1892

Record ID: 50129-3476529

Title: Rankin Scale mRS

Short Description: Clinical Training Center

Long Description: Certification for completion of mRS Rankin Scale training for clinical research Content Date: September 7, 2021

Upload Date: September 9, 2021

Uploaded By: BlueCloud Administrator

Shared Date: September 16, 2021

Verified By: Sheila Worth

Verified Memo: Healthcarepoint

Verification Date: December 12, 2021

88 — Timestamp (or connection date)

PROTECTIVE DEACTIVATION OF GDPR WALLET

BACKGROUND OF THE INVENTION

Field of the Invention

The present invention generally relates to methods and systems for maintaining private data, and more particularly to methods and systems of protecting access to private data.

Description of the Related Art

In the last few years there has been an increasing trend to recognize the value and inherent ownership of personal, private data. One of the primary examples is a recent European Union law known as the General Data Protection Regulation, or GDPR (regulation 2016/679 of the European Parliament). It aims to simplify the regulatory environment for business so both citizens and businesses can fully benefit from the digital economy. The reforms embodied by GDPR are designed to reflect current world views concerning personal data, privacy and consent.

Fundamentally, almost every aspect of our lives revolves around data. From social media companies, to banks, retailers, and governments, almost every service we use involves the collection and analysis of our personal data. A person's name, address, credit card number and much more are all collected, analyzed and, perhaps most importantly, stored by sundry organizations. GDPR makes it a requirement that anyone using such data previously receive consent from the person involved (the data subject), and store it in a manner that ensures compliance with privacy requirements. Failure to comply with GDPR can result in significant fines. The types of data considered personal not only include basic things like name and address, but further extend to photos of the person, genetic information, biometrics (body measurements related to human characteristics), and even something like an Internet (IP) address associated with the individual. GDPR also includes a "right to be forgotten", or right to erasure, which means a person can demand that any of their information being held by an entity be permanently deleted.

GDPR is not the only regulation pertaining to privacy of data. Many countries have other versions; in the United States, the Health Insurance Portability and Accountability Act (HIPAA) is one example. There are also state-by-state laws, such as the California Consumer Privacy Act. Software has been designed to implement these laws in various ways. For instance, an institution seeking permission for access to personal information can present an interface to the person explaining the intended usage and asking the person to consent, and after consent is confirmed, the personal data can be transferred to the institution.

SUMMARY OF THE INVENTION

The present invention in at least one embodiment is generally directed to a computer-implemented method of deactivating access to a private data repository uniquely associated with an individual by constructing the private data repository in a records management system of a computer server by compiling a plurality of electronic records having personal information pertaining to the individual wherein each electronic record has a respective timestamp, granting access rights for all of the electronic records in the private data repository to one or more consumers, receiving a selective command from the individual at the records management system which identifies a selected one of the consumers and requests selective deactivation of access rights granted to the selected consumer, establishing a selective deactivation date for the selected consumer regarding access to the private data repository, and prohibiting access by the selected consumer to any of the electronic records having a timestamp subsequent to the selective deactivation date while maintaining access by the selected consumer to any of the electronic records which have a timestamp prior to the selective deactivation date. In the illustrative implementation a given electronic record includes a content date associated with a subject of the given electronic record, an upload date that the given electronic record was added into the private data repository, a shared date that the given electronic record was first shared by the individual with one of the consumers, and a verification date that the given electronic record was verified by a third party, and each of the content date, upload date, shared date and verification date are different. The timestamp could be the upload date or the shared date. In a preferred embodiment the method further includes receiving a global command from the individual at the records management system requesting deactivation of access rights granted to all of the consumers, establishing a global deactivation date for all of the consumers except the selected consumer regarding access to the private data repository, and prohibiting access by all of the consumers except the selected consumer to any of the electronic records having a timestamp subsequent to the global deactivation date while maintaining access by all of the consumers except the selected consumer to any of the electronic records which have a timestamp prior to the global deactivation date. If the individual has previously consented to a minimum retention period of the private data repository for at least one of the consumers, then a minimum retention date can be computed based on the minimum retention period and, when the minimum retention date has passed, all of the electronic records in the private data repository can be permanently deleted.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

The GDPR and similar laws have presented many challenges to a variety of institutions. Businesses and other organizations that are perfectly accepting of privacy rights sometimes still have legitimate needs for using a person's data, and are often required to by other laws. These needs can collide with the privacy laws. Regulatory agencies typically ask that companies maintain certain data for extended periods of time. For example, the Food & Drug Administration (FDA) requires that a company keep records regarding certain procedures for up to 25 years, like a credential showing that a doctor was properly qualified to carry out the procedure. When that doctor requests that the company no longer use his personal information (right to be forgotten), this presents a serious dilemma for the company.

It would, therefore, be desirable to devise an improved method of controlling access to private data that can balance the rights of individuals regarding their personal information with the legitimate needs of companies using that information. It would be further advantageous if the method could provide an efficient way to comply with privacy laws like the right to be forgotten while still facilitating coordinated communications for a large project like a medical trial that involves dozens of organizations and hundreds of individuals. These and other advantages are achieved in various implementations of the present invention by constructing a private data repository like a GDPR wallet having a professional's credentials and other personal information, and allowing the professional to rescind or deactivate access to the GDPR wallet for a selected institution or connection whereupon the deactivated connection is prohibited from accessing any new records added to the GDPR wallet but is still allowed to see records that it previously had access to. This enhanced deactivation of consent thereby protects the individual but does not remove them from an account of a business that has a legitimate connection need.

Figure 1:
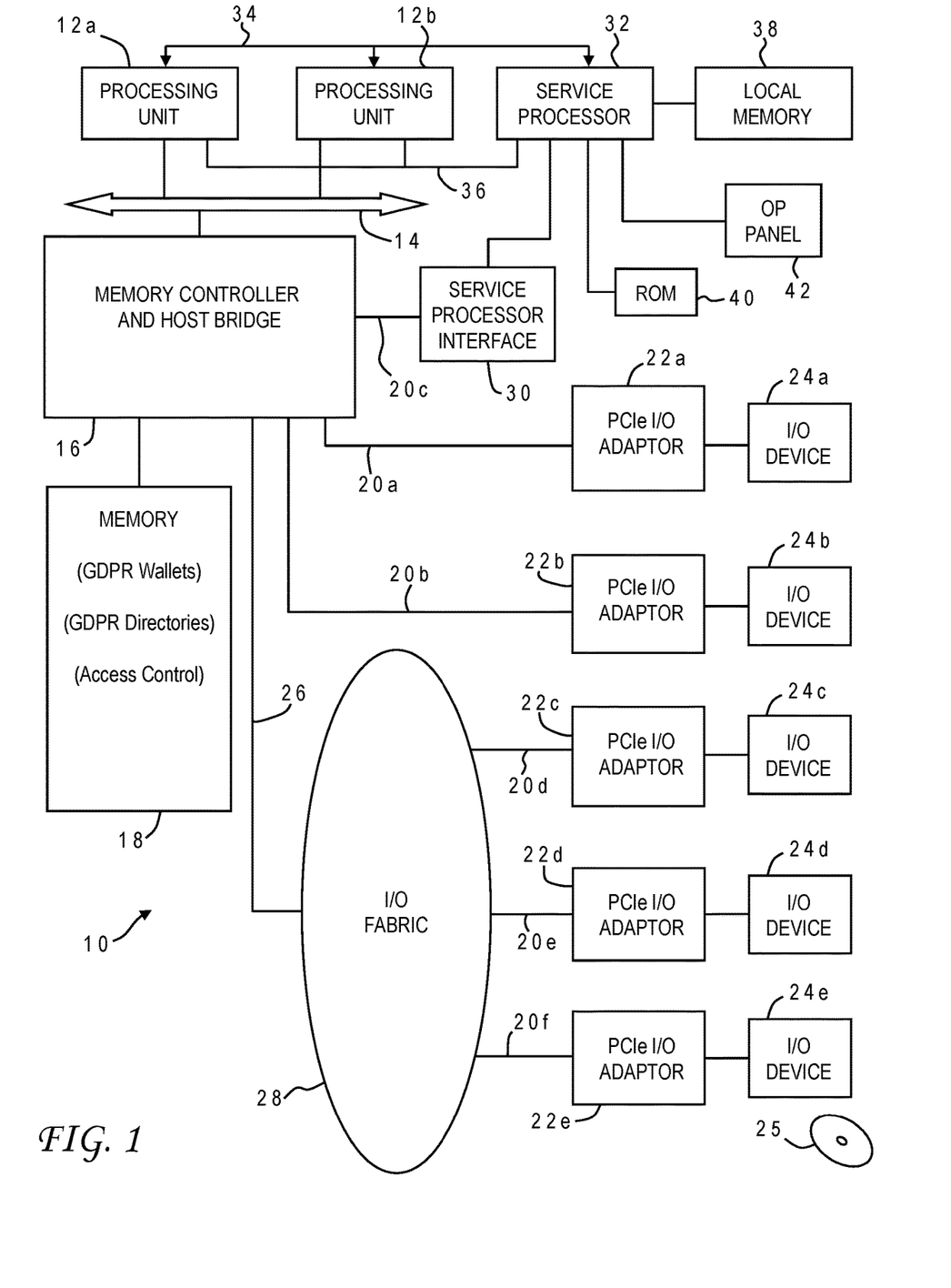
FIG. 1 is a block diagram of a computer system programmed to carry out protective deactivation of a GDRP connection in accordance with one implementation of the present invention.

With reference now to the figures, and in particular with reference to FIG. 1, there is depicted one embodiment 10 of a computer system in which the present invention may be implemented to carry out the deactivated connection of a private data repository containing personal information. Computer system 10 is a symmetric multiprocessor (SMP) system having a plurality of processors 12a, 12b connected to a system bus 14. System bus 14 is further connected to and communicates with a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches. System memory 18 has loaded therein one or more databases, modules and/or program applications in accordance the illustrative embodiment, such as GDPR wallets (private data repositories), GDPR directories (private data directories), and access control that implements the deactivated connection of the present invention as explained further below.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive which receives an optical disk 25 (one example of a computer readable storage medium) such as a CD or DVD, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention. The invention may further be implemented in an equivalent cloud computing network.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-inself-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the access control application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

The present invention may be a system, a method, and/or a computer program product. The computer program product may include one or more computer readable storage media collectively having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computer system 10 carries out program instructions for a computer-implemented method of conditionally deactivating access to a private data repository uniquely associated with an individual that uses novel access control techniques to manage records. Accordingly, a program embodying the invention may additionally include conventional aspects of various access control and data repository tools, and these details will become apparent to those skilled in the art upon reference to this disclosure.

Figure 2:
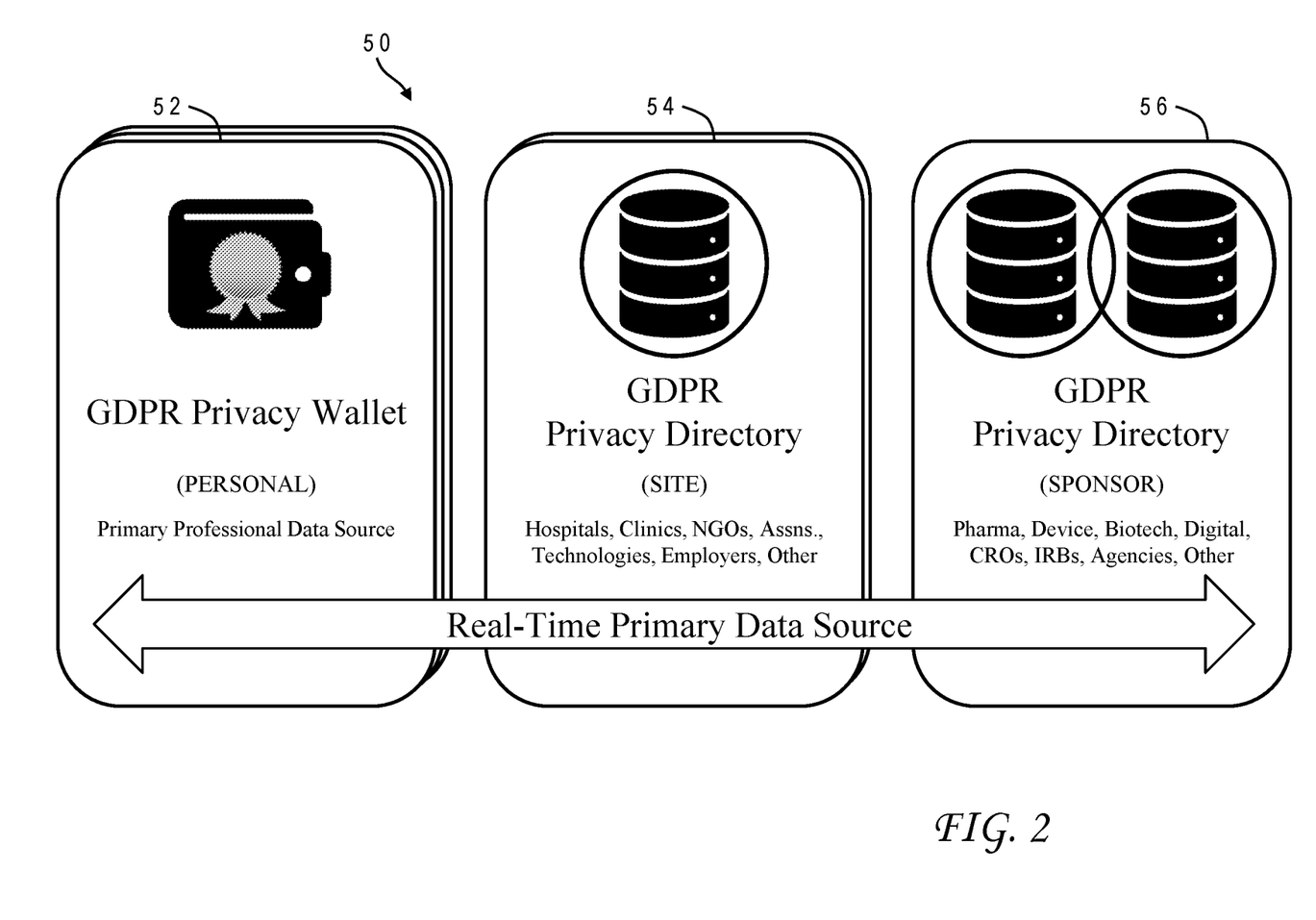
FIG. 2 is a pictorial representation of a credential management system in accordance with one implementation of the present invention showing a private data repository (GDPR wallet) and directories that are built using the private data repository.

Referring now to FIG. 2, there is seen a pictorial diagram of a credential management system 50 with enhanced record retention constructed in accordance with one implementation of the invention. Credential management system 50 includes a plurality of individual (personal) GDPR wallets 52, local (site) GDPR directories 54, and a global (sponsor) GDPR directory 56. Each of GDPR wallet 52, GDPR directory 54 and GDPR directory 56 can be stored on a computer server accessible by various means. The computer server may have the same or similar construction as that seen in FIG. 1 for computer system 10. In some embodiments, one or more aspects of the present invention may be carried out using cloud computing. It is to be understood however that implementation of the teachings recited herein are not limited to a cloud computing environment. Rather, embodiments of the present invention are capable of being implemented in conjunction with any other type of computing environment now known or later developed. The cloud computing environment can communicate with any type of computerized device over any type of network and/or network addressable connection (e.g., via the Internet using a web browser).

A given GDPR wallet 52 contains multiple records of the individual who owns the wallet. The nature of the records may vary according to the application but they are all personal to the individual and considered private data under different privacy laws such as GDPR. Generally, the records may be of three types: patient (health), credit reporting, and professional credentials. While the invention is not limited to any particular one of these types, or combinations thereof (or others as they become relevant), it is convenient to describe the invention with reference to an individual who is a healthcare professional such as a doctor or provider, and for that exemplary implementation the records in their GDPR wallet are professional credentials or competencies such as licenses, diplomas, training, certifications, etc.

Credential management system 50 provides enhanced access control for other individuals or organizations (consumers) to GDPR wallet 52. When creating an account with the system, the wallet owner can consent to release of the wallet contents to interested third parties according to various terms and conditions. These may optionally include a payment of some sort to the wallet owner, for each connection made, with the consumers covering the cost of the payment; the idea is that anyone who wants a person's private data (usually for commercial purposes) should in turn be willing to pay for that data. Additionally, the consumer of the data agrees to abide by privacy terms such as remaining GDPR compliant. The owner of the wallet can be notified whenever a consumer requests access to their wallet, and this connection (along with the connection date) can be visible to the wallet owner in a user interface as described further below in conjunction with FIG. 8.

A consumer making a connection request of a wallet owner may require that their personal information remain usable for some minimum period of time or until some specified date. This requirement may be necessary for various reasons, such as other legal requirements that apply to the consumer. As mentioned above, the Food & Drug Administration typically requires that certain data supporting clinical trials and the like be retained by the organization in charge of the trial for 25 years. This requirement may be presented to the wallet owner as a notification or warning, with an additional acknowledgement or consent of the owner being made before the connection is consummated.

GDPR wallet 52 thereby becomes a primary professional data source for GDPR directory 54. GDPR directory 54 is utilized by an organization that is involved in an enterprise or undertaking that requires participation by many entities. Further to the exemplary implementation, GDPR directory may be a local site that is carrying out a study as part of a healthcare (medical, pharmaceutical, genetic, etc.) trial. The site may for example be a hospital, clinic, nongovernmental organization (NGO), research association, technology company, or other employer. GDPR directory 54 is constructed by aggregating GDPR wallets from multiple individuals and/or organizations. These individuals may include employees of the company, contract workers, or others who are not monetarily engaged with the site but are still doing related work for the study. Further to the exemplary implementation, the site is a hospital and one of the individuals working on the study is the owner of GDPR wallet 52, i.e., a healthcare professional. Thus, the site operator can examine its GDPR directory 54 to access GDPR wallet 52 and see the various credentials of the professional, and accordingly ensure compliance with any other relevant regulatory requirements, e.g., making sure the professional has a particular competency required for the study.

Figure 7:
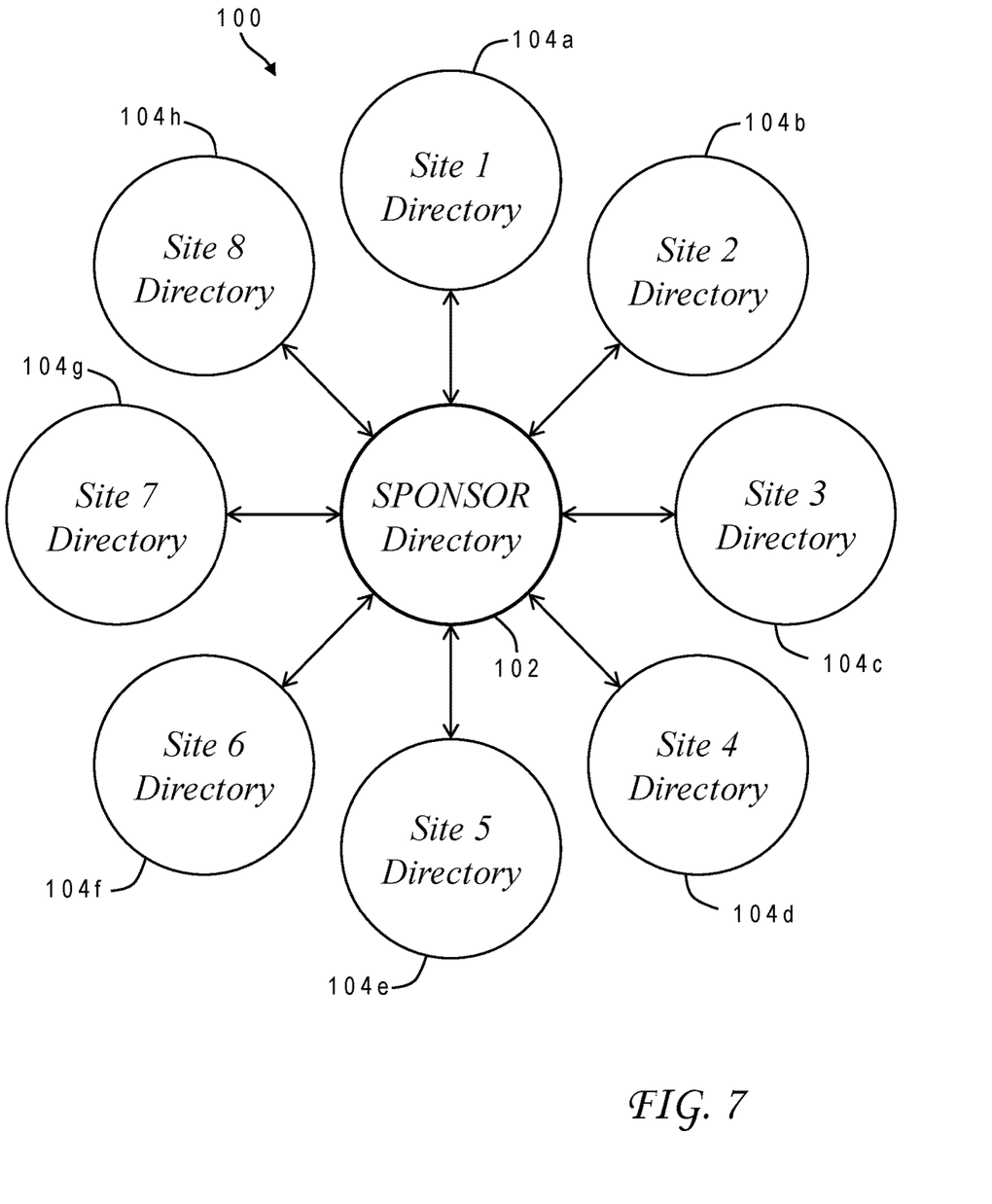
FIG. 7 is a chart illustrating an e-trial site network having a global (sponsor) directory constructed from multiple local (site) directories in accordance with one implementation of the present invention.

As described further below in conjunction with FIG. 7, multiple GDPR directories 54 may be thus constructed for different companies/departments/studies involved in the trial. A high-level GDPR directory 56 for the sponsor of the trial can then be further constructed by aggregating all of the site GDPR directories 54 in the common undertaking. The sponsor may for example be a pharmaceutical company, medical device manufacturer, biotech company, contract research organization (CRO), institutional review boards (IRB), government agency, university, etc. In this manner, GDPR wallet 52 is becomes a real-time primary data source that can be accessed by any qualified entity whether at their site or with the sponsor.

The contents of a GDPR wallet can be accessed by either its owner or other party having access rights via a GDPR directory with any convenient user interface, such as a web browser or special-purpose application with appropriate security measures such as login or authentication information. The web browser may be running on a desktop computer having a construction like computer system 10 of FIG.

Figure 3:
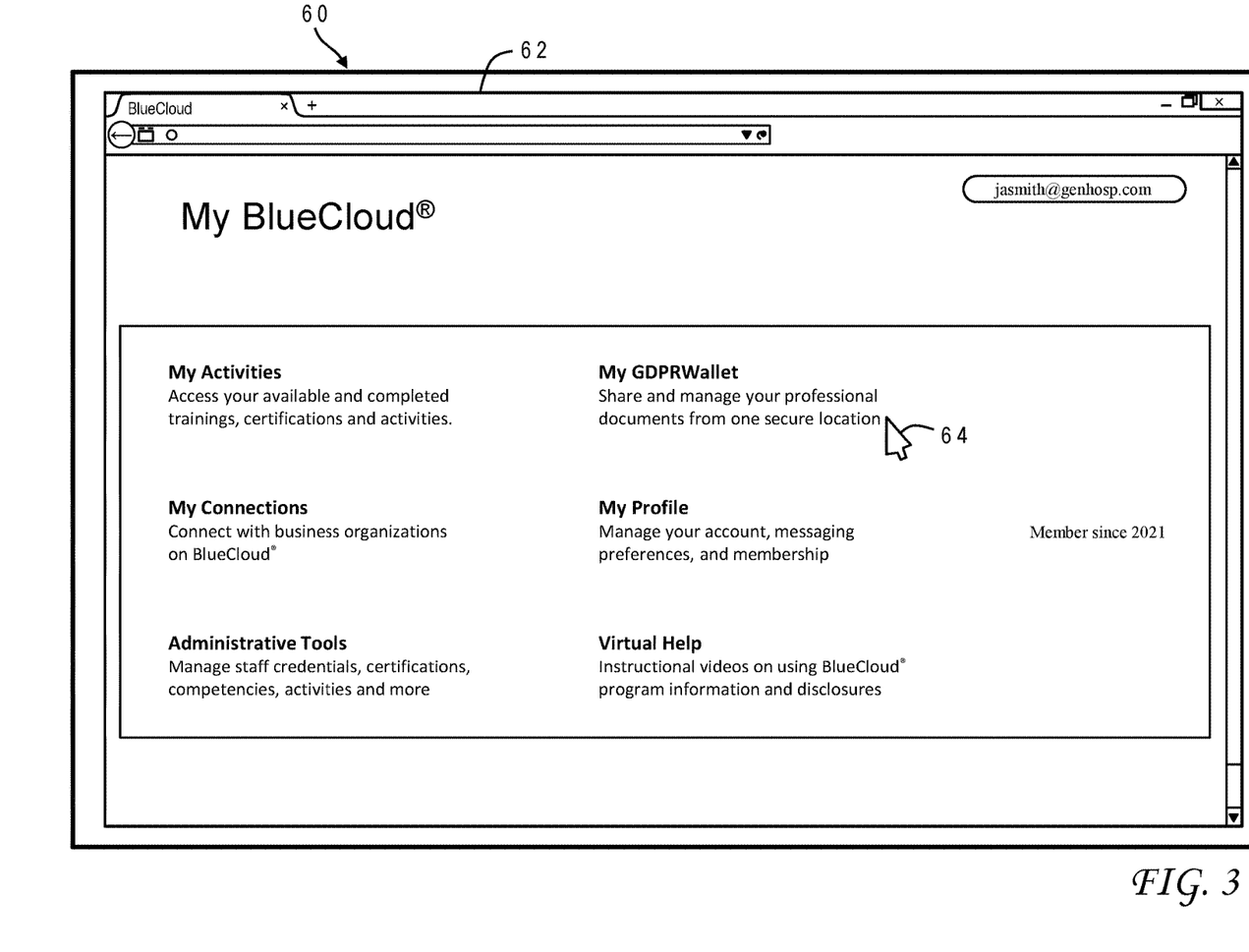
FIG. 3 is a screenshot of an account overview page for a healthcare professional showing links to various services including connections and a GDPR wallet in accordance with one implementation of the present invention.

1 but this implementation should not be construed as limiting since the browser could be running on a variety of alternative computing devices such as a laptop computer, notebook, tablet, smartphone, dumb terminal, console, etc. FIG. 3 shows a screenshot 60 of an account overview page for the owner of GDPR wallet 52 in accordance with one implementation of the invention. Screenshot 60 (as well as other screenshots referred to below) is taken from the display device of the computer system running the browser, i.e., an I/O device 24 (FIG. 1). The browser appears as a window 62 of the display device, and has various conventional features such as menu commands, window control buttons, a search field, navigation buttons, and one or more tabs that present content, that are all familiar to those skilled in the art.

The account overview page might be the default page presented to the wallet owner upon signing in to credential management system 50, and presents various options as hyperlinks in the user interface to gain access to the services offered by the system. In this embodiment, there are six hyperlinks for "My Activities" (a catalog of activities of the owner), "My GDPRWallet" (the GDPR wallet 52), "My Connections" (a list of all entities with whom the owner has connected and is sharing wallet records, i.e., sites and sponsors), "My Profile" (account and membership details), "Administrative Tools" (management of others), and "Virtual Help" (instructional videos on how to use credential management system 50). The owner activates a given hyperlink using a graphical pointer 64 (e.g., mouse) or other input device such as a touchscreen.

Figure 4:
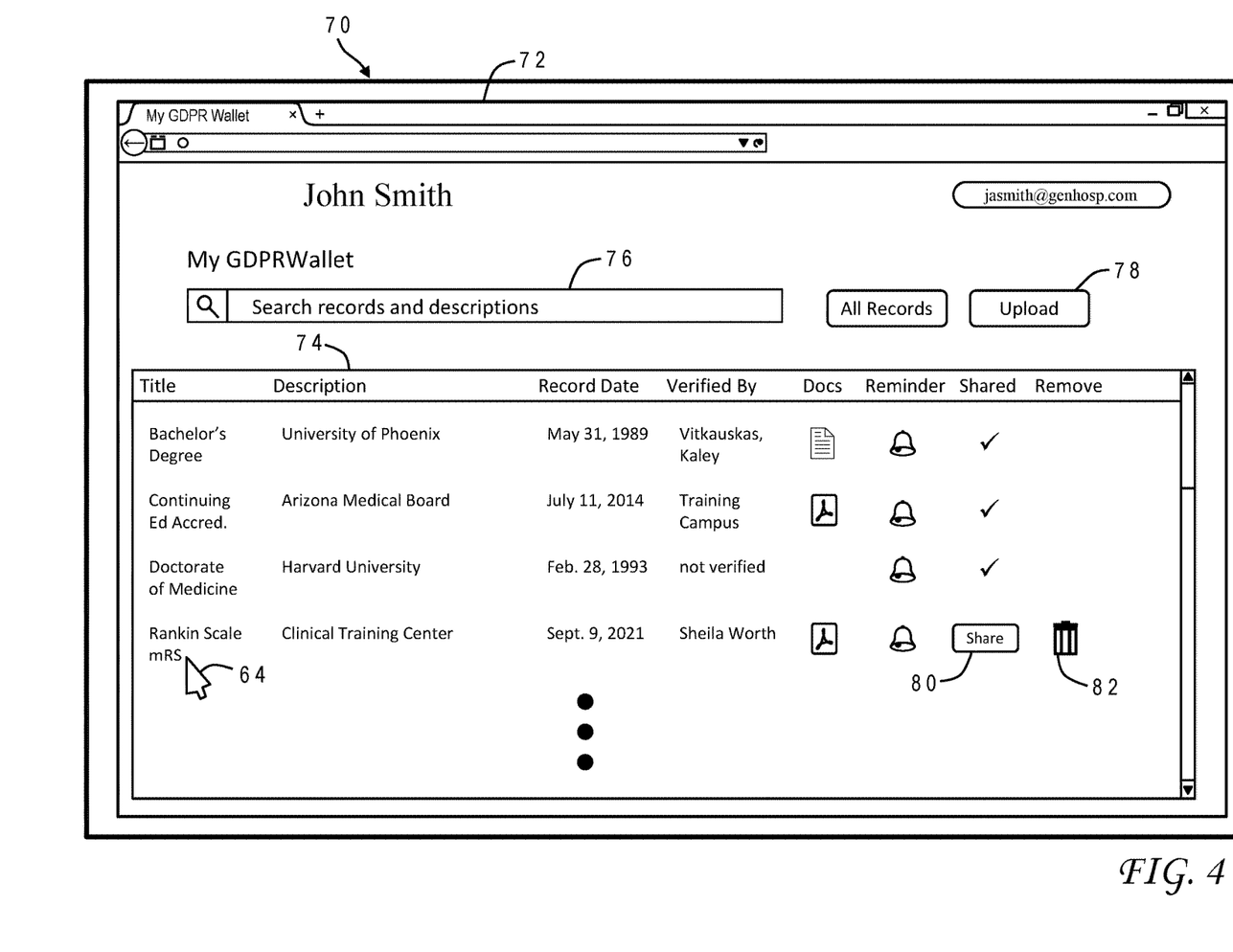
FIG. 4 is a screenshot of a sample GDPR wallet in accordance with one implementation of the present invention.

Further to this implementation, clicking on the "My GDPRWallet" hyperlink of the account overview page brings the owner to a GDPR wallet management window 72 seen in the screenshot 70 of FIG. 4. GDPR wallet management window 72 shows the owner's name (in this case "John Smith" who works at General Hospital), along with a list 74 of all of the records in the wallet as well as a search field 76 allowing the owner to search for a specific record (more advanced options can be provided for searching such as searching particular fields of the records). Each record is shown with basic information including a title, a description, a record date, a verification, any related document (e.g., a PDF or JPEG file), a reminder service, an indication of whether the record has been shared, and a remove field. In this sample wallet four records are shown, for the owner's bachelor's degree, a continuing education credit, a medical doctor diploma, and a specialty certification ("Rankin Scale mRS"). New records are uploaded using the "Upload" button 78 which initiates a dialog box (not shown) allowing the user the enter the various data for the record; for further details see U.S. Pat. No. 10,713,742, which is hereby incorporated. A given record may also be verified by one or more third parties as described in that patent to ensure authenticity of the records. If a record has not been verified the indication under that column will be "not verified".

Once a record has been uploaded, it can be shared, i.e., approved for release to consumers, by clicking a "Share" button 80. Prior to sharing a record, it may be removed by clicking a remove object 82, in this case a trash can icon. Removing the record completely erases it from the wallet list 74. Once the record is shared, even with just one other person or organization, "Share" button 80 will disappear and be replaced by a check mark indicating that the record has been shared, and the remove object 82 will disappear from the user interface, i.e., once shared a record cannot thereafter be removed, subject only to deletion of all records (possibly after some minimum retention period) pursuant to the owner's demand to be "forgotten". The GDPR wallet records can be accessed by multiple systems. For instance, in addition to the owner viewing and managing the records in the GDPR wallet management window 72, a site operator or sponsor can view the records through its corresponding GDPR directory, as explained further below in conjunction with FIG. 6.

Clicking on any of the records in the list (e.g., on a title) brings up a record detail page showing more information regarding the record. Further to this implementation, clicking on the "Rankin Scale mRS" record displays that information as seen in the sample GDPR wallet record 86 of FIG. 5. The wallet record is different from any document uploaded to supplement the record. A given wallet record can contain various information including but not limited to the name of the record owner, a identification (ID) number of the owner used by the credential management system to uniquely distinguish the owner, an ID of the record itself, a title (that appears on record list 74), a short description (that also appears on record list 74), a longer description, a content date associated with the subject of the record itself (i.e., a date of completion of the work involved in the record or other date of certification), an upload date that the record was added into the GDPR wallet, a shared date that the record was first shared by the owner (which may be different from the upload date), and a verified date of any verification by a third party. This specific sample record 86 shows that the individual has completed certification for a patient interview process (Rankin Scale) that is valid for use in clinical research, and can be viewed by a site operator or sponsor (through the GDPR directory interface of FIG. 6) to ensure that the individual is thus qualified for the particular study at hand.

Figure 5:
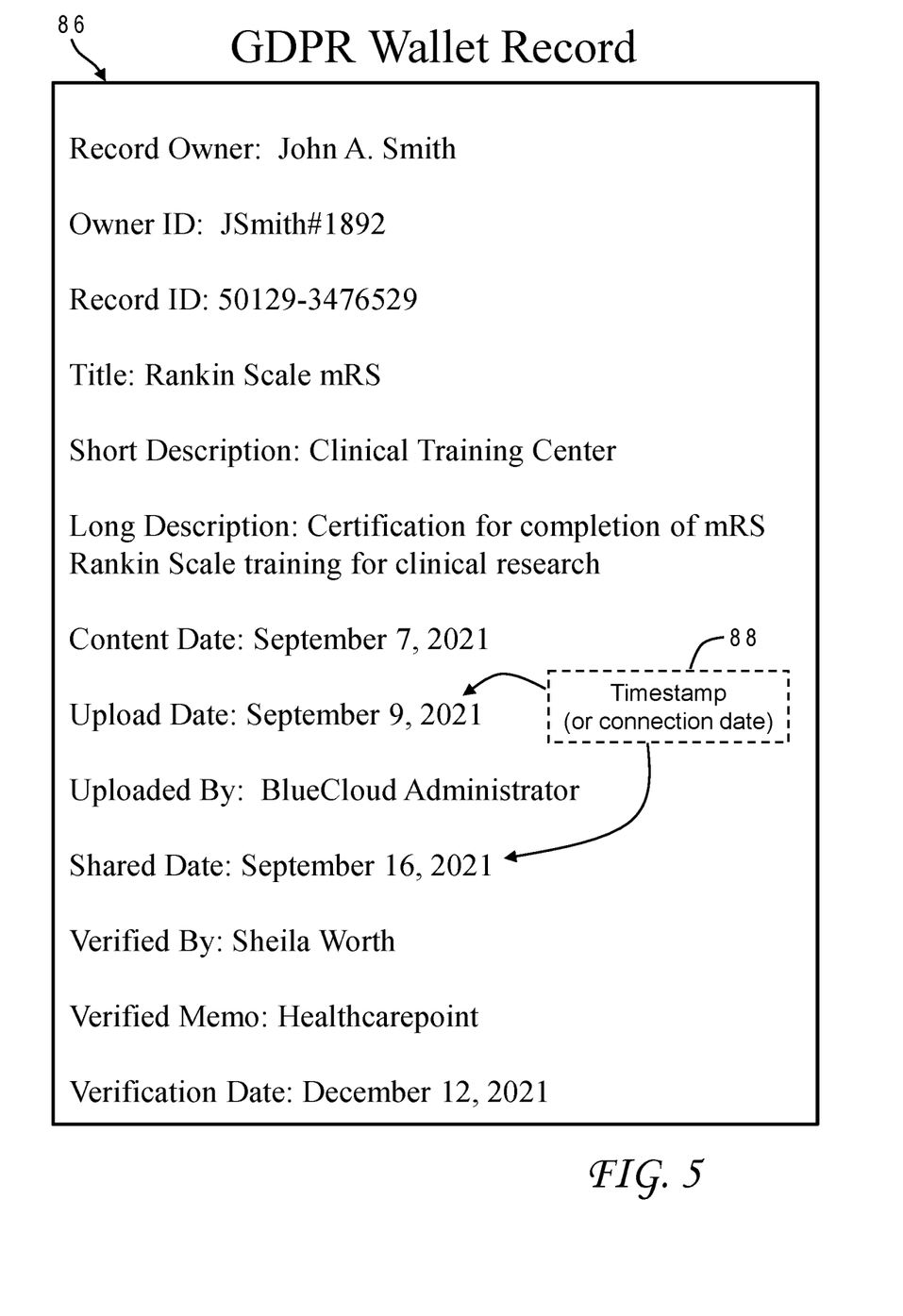
FIG. 5 is a text representation of a sample GDPR wallet record stored electronically in the GDPR wallet of FIG. 4 in accordance with one implementation of the present invention.
Figure 8:
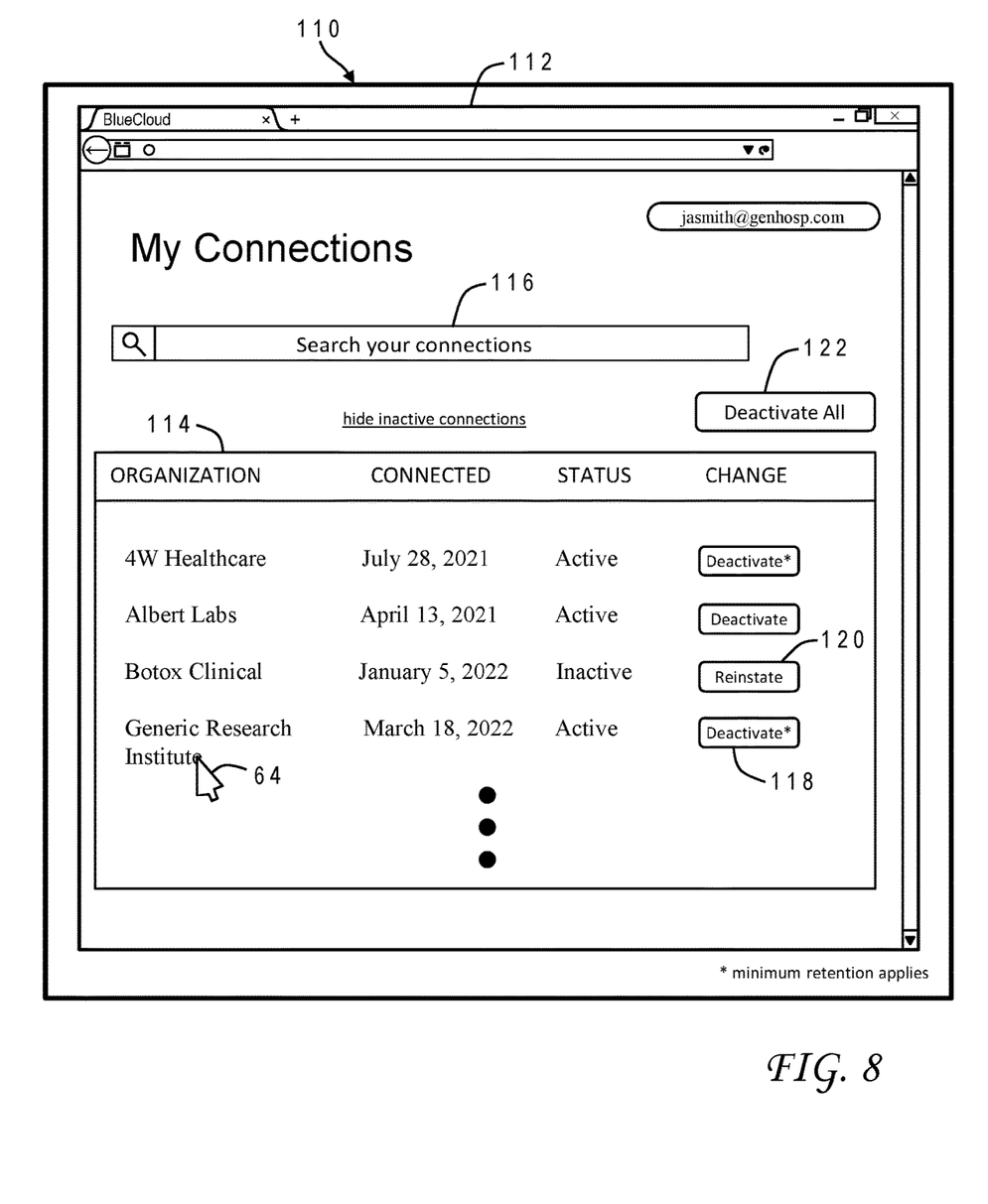
FIG. 8 is a screenshot of a connections page depicting a user interface that allows the private data owner to selectively deactivate data access by organizations in accordance with one implementation of the present invention.

The credential management system can further apply a timestamp 88 to each record, to facilitate the protective deactivation feature of the present invention as explained further below in conjunction with FIG. 8. In some implementations the timestamp is the upload date, in another implementation it is the shared date. In a further alternative implementation, a single record can have different timestamps associated with different consumers based on the date a connection between the individual and the respective consumer was made.

Figure 6:
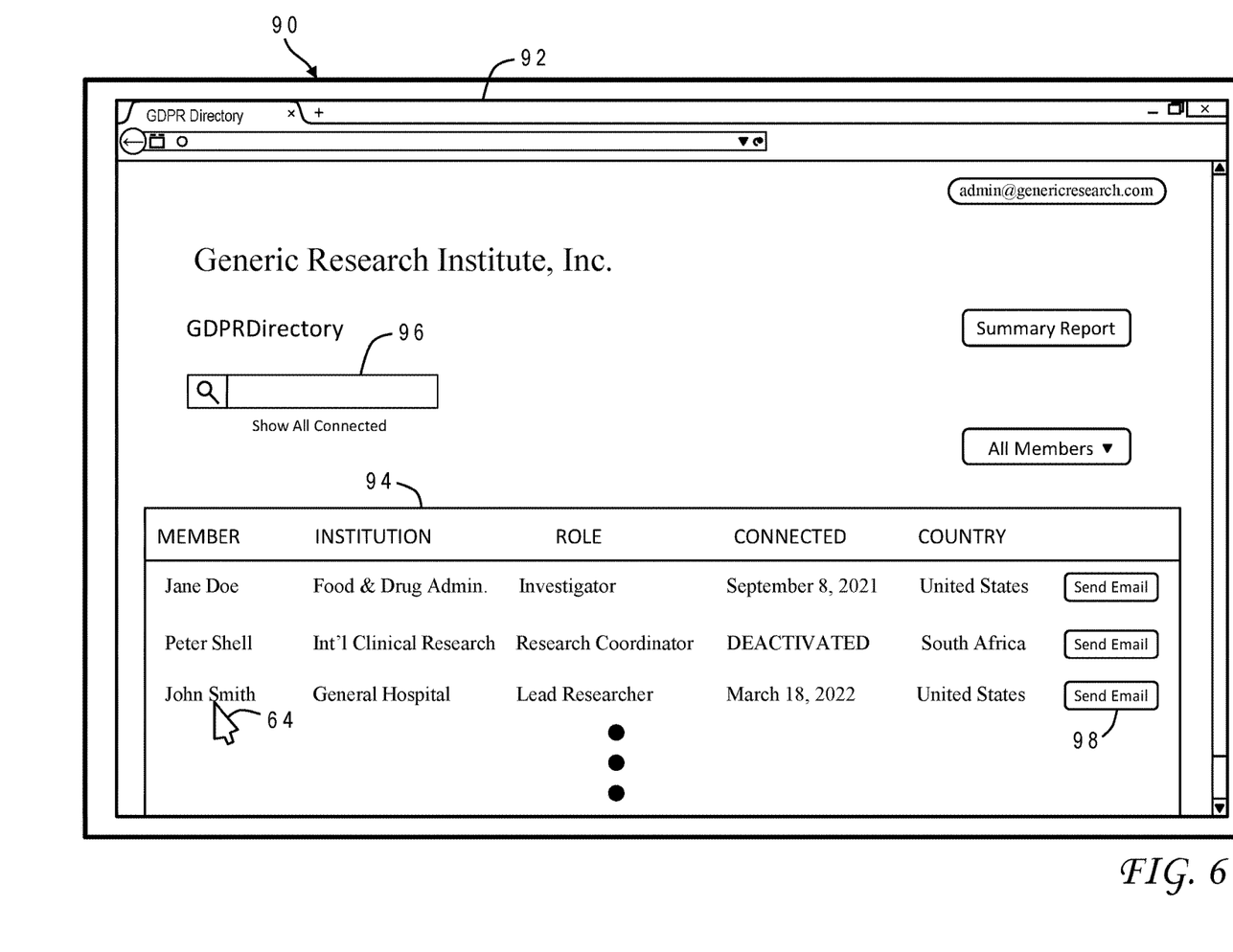
FIG. 6 is a screenshot of a site GDPR directory having a list of participants who each have a GDPR wallet in accordance with one implementation of the present invention.

FIG. 6 illustrates a screenshot 90 of a site (local) GDPR directory window 92 in accordance with the exemplary implementation for a company "Generic Research Institute, Inc." which is employing or otherwise utilizing the skills of various individuals and/or organizations as part of its site work, including Dr. Smith from General Hospital. GDPR directory window 92 is accessed through an account of the site operator, not the individual's, and has various features such as a list 94 of all of the site participants for the study as well as a search field 96 allowing the site administrator to search for a specific participant. Each participant in list 94 is shown with basic information including their name, the institution they are associated with, their role for the study, when the connection between the site and the participant was made through the credential management system, and the country they reside in. In this sample directory three participants are shown, for Jane Doe, Peter Shell, and John Smith (the owner of GDPR wallet 72). There could be hundreds or even thousands of participants in the directory. A "Send Email" button 98 can be pressed to conveniently spawn an email communication program or module.

Clicking on a participant's name in list 94 will bring up the GDPR wallet associated with that person. For example, clicking on "John Smith" will bring up an interface that is essentially same as the GDPR wallet features of FIG. 4. Presuming the connection is still valid, i.e., it has not been deactivated as described further below, all of the GDPR wallet records will be accessible. The site administrator can then proceed to click on one of the wallet records to see the details as in FIG. 5. In this manner the administrator can document and verify any credential requirements for the participants.

As noted above in relation to FIG. 2, in addition to one or more local GDPR directories involved in a project, there may be a global GDPR directory account on the credential management system that is owned by a sponsor or other supervisory institution. FIG. 7 shows such an e-trial site network 100 having a sponsor directory 102 constructed from multiple local directories 104a-104h in accordance with one implementation of the present invention. Sponsor directory 102 constitutes a separate collection of information for all of the participants involved in the enterprise. In this manner, the credential management system provides a real-time link between all sorts of entities, including doctors or other healthcare professionals, hospitals, government agencies, telemedicine sites, nongovernmental organizations, CTSAs, contract research organizations, research institutes, sponsors, publishers, trade associations, educators, medical device manufacturers, technology specialists, credentialing services, and even the patients themselves who are subjects of the studies. The credential management system can provide an interface for sponsor directory 102 similar to the site directory as seen in FIG. 6 so an administrator at the sponsor can again click on a given participant to inspect their credentials. There could be more levels to the hierarchy of FIG. 7, i.e., there could be an additional supervisory account above sponsor directory 102, or a given site directory 104 could be composed of multiple sites lower in the hierarchy. This arrangement thus has some aspects that can be considered centralized while others are decentralized.

At some point in time an individual owning a GDPR wallet might desire to limit the release of their information to one or more of the consumers they have previously connected with. FIG. 8 shows another screenshot 110 of a connections page 112 for the wallet owner that can be used to manage the connections and selectively deactivate them in accordance with the exemplary implementation. Connections page 112 may be called up by clicking on the "My Connections" link in the individual's account overview page as seen in FIG. 3. Connections page 112 includes a list 114 of all of the connections made as a result of requests from various consumers as well as a search field 116 allowing the individual to search for a specific connection. Each connection is shown with basic information including the organization name, the date the connection with the organization was made, a status indicator for the connection, and a field for changing the status. In this sample connections page four connections are shown, for 4W Healthcare, Albert Labs, Botox Clinical, and Generic Research Institute (the owner of GDPR directory 92). The connection date on connections page 112 will match the connection date for the same connection on the organizations GDPR directory (e.g., "Mar. 18, 2022" for the connection between John Smith and Generic Research Institute). Connections page 112 could also have "Send Email" buttons similar to those seen in FIG. 6 to facilitate quick communication from a consumer to a connected wallet owner.

When a wallet owner wants to stop releasing data to a consumer, they will click on the corresponding "Deactivate" button 118 to mark that connection inactive. This action may be taken for any number of individual/selective connections, with the remaining connection(s) still being active. A deactivated connection preferably remains in list 114 with the status reading "Inactive", as shown in FIG. 8 for the Botox Clinical connection. A filter can optionally be presented to show/hide inactive connections in list 114. In this selective deactivation mode, the date of each respective user-initiated change of status to inactive is used to determine the cutoff date for wallet records that are visible to the deactivated organization. Records that were already consumed by that connection at the time of this action by the user will remain available to the organization. However, any subsequent documents would not be available, i.e., the credential management system will prohibit access to any of the electronic records having a timestamp subsequent to the deactivation date. The deactivation date thus serves as a filter for the records. A consumer may become aware of a deactivation upon seeing that a participant in the GDPR directory 92 has a connected date showing as "DEACTIVATED" as seen in FIG. 6 for participant Peter Shell.

Any inactive connection may be reinstated by the user by clicking a "Reinstate" button 120 which is only in the change field of a connection when its status is inactive. In the preferred implementation, if the organization is under contract to pay for connections then the reinstatement must first be acknowledged by a companion mechanism on the GDPR directory administrative tool in that space. Until acknowledgment by an authorized administrator, the connection remains inactive which can have other effects, such as preventing a participant from logging in to that space or uploading records to that space, and record visibility by the participant remains restricted.

There is also an option on connections page 112 that allows a wallet owner to mark their account's connection as inactive globally, i.e., for all consumers subscribing to the credential management system including any and all current connections of the wallet owner. This option is initiated by clicking a "Deactivate All" button 122. In the illustrative embodiment, the same option is automatically initiated if a user elects to become inactive for every connection in list 114 by individually deactivating each connection via "Deactivate" buttons 118 (over any period of time). In this global deactivation mode no connections remain active, but this status can also be reversed at any time by the user subject to the same acknowledgement procedure described above when an organization that hosts a connection is under contract to pay for connections. The impact on record visibility always relates back to the specific date the status was changed to inactive for each connection, i.e., there will be a different (later) deactivation date for consumers who were still active as of the global deactivation. If the global option was used and no individual connections were ever marked inactive prior to that change, then that single date will be used to determine the cutoff for all connections.

In the illustrative embodiment this protective deactivation occurs when there is some minimum retention period that applies to the connection. As noted above, there may be situations where a business is required to retain certain underlying information for a study or trial, or for other reasons in different circumstances. The "Deactivate" button for a given connection may include a footnote or other indicator designating such a requirement, reminding the wallet owner that they can disable access to future records but not already consumed records. The credential management system can keep track of these minimum retention requirements for all consumers of a wallet, and once that period expires for a particular consumer then access by that consumer to all wallet records can be prohibited. Additionally, if a wallet owner has deactivated all connections and any minimum retention periods for all consumers have passed, then the wallet itself can be completely removed to satisfy the "right to be forgotten", i.e., all of the wallet records can be permanently erased. In such a case, a consumer attempting to access a participant's wallet will simply be shown an empty list, or alternatively redirected to a notification page explaining that access to all records has been revoked and advising that new consent must be obtained.

It should be noted that in the preferred embodiment deactivation of a connection by the wallet owner does not technically remove the owner's account from the business' connections list, i.e., it will still show up in the local and global GDRP directories. There may be other functionalities enabled with the credential management system or adjunct systems and those remain operative for the connection. The deactivation only prevents any further sharing of information added to the GDPR Wallet.

Figure 9:
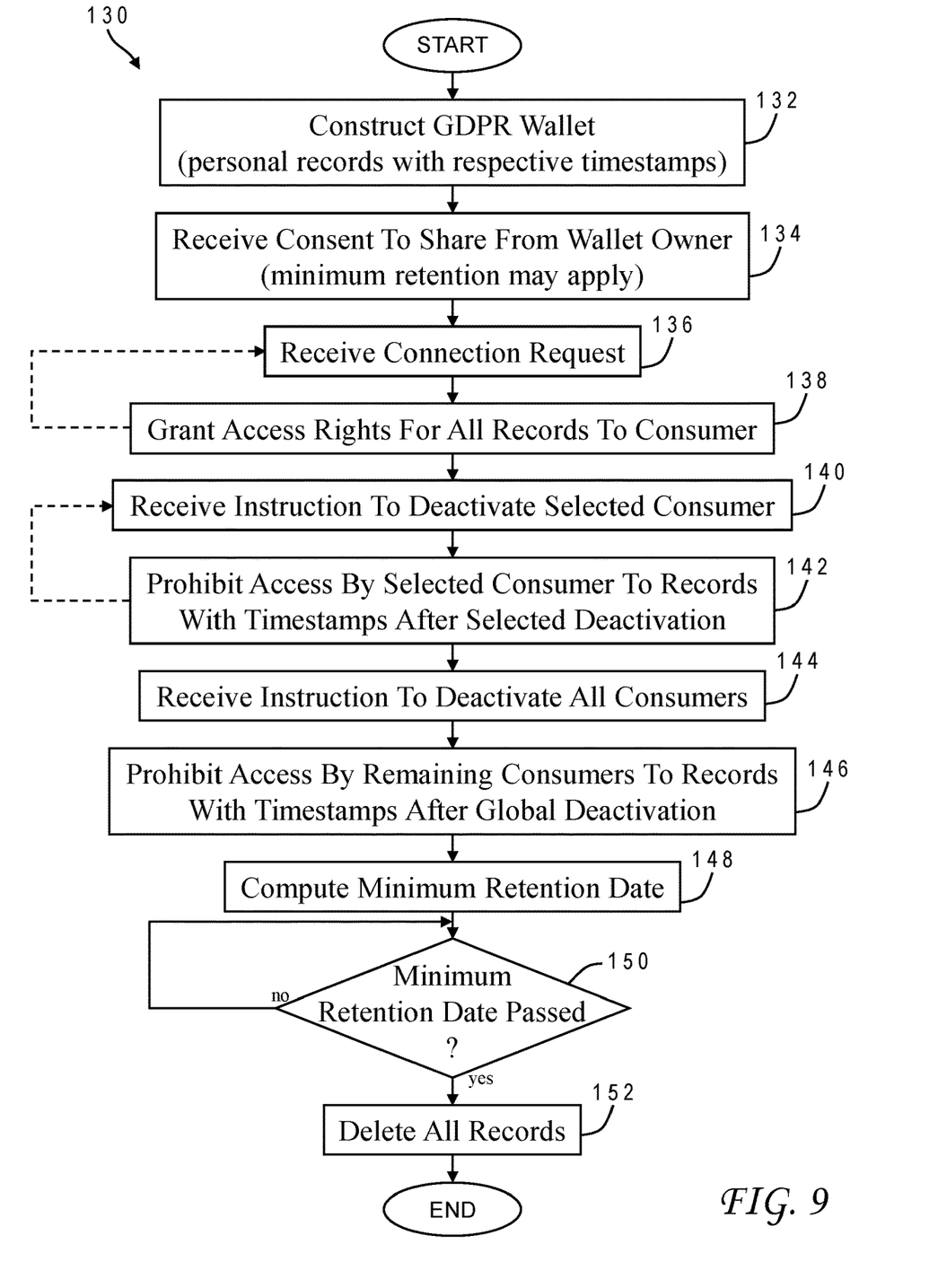
FIG. 9 is a chart illustrating the logical flow for a GDPR wallet access control process in accordance with one implementation of the present invention.

The present invention may be further understood with reference to the chart of FIG. 9 which illustrates the logical flow for a GDPR wallet access control process 130 in accordance with one implementation of the present invention. Those skilled in the art will appreciate that the features previously disclosed herein may be executed in assorted manners so the flow of FIG. 9 is just a sample of a particular manner of execution that provides general insight into the operation of the invention, and should not be construed in a limiting sense. Process 130 may be carried out by the aforementioned computer server, and begins by constructing a person's GDPR wallet 132. This may be carried out using the procedure described above in relation to FIG. 4, and includes applying a timestamp to each personal record in the wallet. At some point, preferably during account setup, the individual provides the consent 134 required by various privacy laws for the use and disclosure of the wallet contents. This consent may include an explicit warning or acknowledgement that regardless of the user's right to be forgotten, the system may still retain data for limited periods of time to fulfill other obligations of the wallet consumers. Over time, the system receives connection requests 136 from consumers, and grants access rights 138 for all records in the wallet to each approved connection. When a user decides to limit wallet access for a specific consumer, the system receives that instruction 140, and responsively prohibits access by that consumer 142 to any records having timestamps later than the instruction date, i.e., any records added to the wallet after deactivation. At a later point in time, the user has decided to revoke access rights for all remaining connections, and the system receives this global deactivation instruction 144. Thereafter, the system will prohibit access by the remaining consumers 146 to any records having timestamps later than the global deactivation. When the global mode is initiated, the system will also compute a minimum retention date for the records. In this context, the global minimum retention date is the latest date required among any connections having a minimum retention period, i.e., the records are not completely removed until the system knows they are no longer required by any of the connections. For example, the first connection that was individually deactivated by the wallet owner might have a 25-year retention requirement, and the global deactivation occurring two years later might include a connection having a 20-year retention requirement, but in these circumstances the first deactivated connection bears the longest overall retention period so the minimum retention date is computed as 25 years from the first (selective) deactivation date. The system can periodically check to see if this date has passed 150 (or set an alarm routine to provide a trigger once the day has passed), and thereafter all of the records in the wallet may be permanently discarded 152.

The present invention thereby provides a superior solution to compliance with privacy laws that protect personal data while still ensuring legitimate access to records even after receiving a request to be forgotten. It is critical to provide an adequate confidence level to businesses that the system is GDPR-compliant but not at the expense of their master file. The system further improves healthcare and clinical research by providing a real-time data source for all entities involved in a project. The protective deactivation of the present invention can further be implemented without adversely affecting other business functionalities built-in to the connections system.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention has been described to an exemplary implementation involving healthcare trials and medical professionals, but it is not so limited. It could be used in a variety of settings such as patient care, project management, insurance administration, banking oversight, etc. It is therefore contemplated that such modifications can be made without departing from the spirit or scope of the present invention as defined in the appended claims.

What is claimed is:

1. A computer-implemented method of deactivating access to a private data repository uniquely associated with an individual comprising: constructing the private data repository in a records management system of a computer server by compiling a plurality of electronic records having personal information pertaining to the individual wherein each electronic record has a respective timestamp; granting access rights for all of the electronic records in the private data repository to one or more consumers; receiving a selective command from the individual at the records management system which identifies a selected one of the consumers and requests selective deactivation of access rights granted to the selected consumer; establishing a selective deactivation date for the selected consumer regarding access to the private data repository; and prohibiting access by the selected consumer to any of the electronic records having a timestamp subsequent to the selective deactivation date while maintaining access by the selected consumer to any of the electronic records which have a timestamp prior to the selective deactivation date; after said prohibiting access, receiving a reinstatement request to reinstate the deactivated access rights of the selected consumer; and allowing access by the selected consumer to all of the electronic records without regard to their timestamps.

2. The computer-implemented method of claim 1 wherein: a given electronic record includes a content date associated with a subject of the given electronic record, an upload date that the given electronic record was added into the private data repository, a shared date that the given electronic record was first shared by the individual with one of the consumers, and a verification date that the given electronic record was verified by a third party; and each of the content date, upload date, shared date and verification date are different.

3. The computer-implemented method of claim 2 wherein the timestamp is the upload date.

4. The computer-implemented method of claim 2 wherein the timestamp is the shared date.

5. The computer-implemented method of claim 1 further comprising: receiving a global command from the individual at the records management system requesting deactivation of access rights granted to all of the consumers; establishing a global deactivation date for all of the consumers except the selected consumer regarding access to the private data repository; and prohibiting access by all of the consumers except the selected consumer to any of the electronic records having a timestamp subsequent to the global deactivation date while maintaining access by all of the consumers except the selected consumer to any of the electronic records which have a timestamp prior to the global deactivation date.

6. The computer-implemented method of claim 5 wherein the individual has previously consented to a minimum retention period of the private data repository for at least one of the consumers, and further comprising computing a minimum retention date based on the minimum retention period; determining that the minimum retention date has passed; and responsive to said determining, permanently deleting all of the electronic records in the private data repository.

7. The computer-implemented method of claim 1 further comprising: constructing a private data directory for the selected consumer wherein the private data directory includes an entry for the individual which provides through a directory interface both access to the private data repository and a communications link between the selected consumer and the individual; and maintaining the communications link after initiating said prohibiting access.

8. The computer-implemented method of claim 7 wherein the private data directory interface provides an indication to the selected consumer that the individual has deactivated access rights granted to the selected consumer.

9. The computer-implemented method of claim 1 further comprising: in response to receiving the reinstatement request, determining by the records management system that a payment is required from the selected consumer before granting access to the private data repository; sending a notification to the selected consumer regarding the reinstatement request; and receiving an acknowledgment of reinstatement permitting the payment from the selected consumer, wherein said allowing access occurs only after said receiving of the acknowledgement.

10. A computer system comprising: one or more processors which process program instructions; a memory device connected to said one or more processors, said memory device having stored therein a plurality of private data wallets wherein a given private data wallet is associated with a respective individual and includes a plurality of electronic records having personal information pertaining to the respective individual, a plurality of site directories wherein a first site directory is constructed from a first set of the private data wallets and each of the individuals associated with the first set of the private data wallets is a participant in a first project at a first site, and wherein a second site directory is constructed from a second set of the private data wallets and each of the individuals associated with the second set of the private data wallets is a participant in a second project at a second site, and a sponsor directory constructed from at least the first and second site directories such that each private data wallet in the first set and the second set becomes a real-time data source for the sponsor directory wherein the first site and the second site are both part of a common undertaking; and program instructions residing in said memory device for providing a first user interface to each of the individuals wherein the first user interface allows a particular individual to upload the electronic records to the private data wallet of the particular individual and separately authorize sharing of a specific one of the electronic records in the private data wallet of the particular individual, and providing a second user interface to operators of each of the site directories and the sponsor directory wherein the second user interface allows one of the operators of a particular directory to view the electronic records of any of the private data wallets in the particular directory and wherein each electronic record has a respective timestamp, and said program instructions further: receive a selective command from the particular individual which identifies a selected one of the sites and requests selective deactivation of access rights for the electronic records in the private data wallet of the particular individual granted to the selected site, establish a selective deactivation date for the selected site regarding access to the private data wallet of the particular individual, prohibit access by the selected site to any of the electronic records in the private data wallet of the particular individual having a timestamp subsequent to the selective deactivation date while maintaining access by the selected site to any of the electronic records in the private data wallet of the particular individual which have a timestamp prior to the selective deactivation date, receive a reinstatement request to reinstate the deactivated access rights of the selected consumer, allow access by the selected consumer to all of the electronic records without regard to their timestamps, determine that a payment is required from the selected consumer before granting access to the private data repository, send a notification to the selected consumer regarding the reinstatement request, and receive an acknowledgment of reinstatement permitting the payment from the selected consumer, wherein access is allowed only after said receiving of the acknowledgement.

11. The computer system of claim 10 wherein: a given electronic record includes a content date associated with a subject of the given electronic record, an upload date that the given electronic record was added into the private data repository, a shared date that the given electronic record was first shared by the individual with one of the consumers, and a verification date that the given electronic record was verified by a third party; and each of the content date, upload date, shared date and verification date are different.

12. The computer system of claim 11 wherein the timestamp is the upload date.

13. The computer system of claim 10 wherein said program instructions further: receive a global command from the individual at the records management system requesting deactivation of access rights granted to all of the consumers; establish a global deactivation date for all of the consumers except the selected consumer regarding access to the private data repository; and prohibit access by all of the consumers except the selected consumer to any of the electronic records having a timestamp subsequent to the global deactivation date while maintaining access by all of the consumers except the selected consumer to any of the electronic records which have a timestamp prior to the global deactivation date.

14. The computer system of claim 13 wherein the individual has previously consented to a minimum retention period of the private data repository for at least one of the consumers, and said program instructions further: compute a minimum retention date based on the minimum retention period; determine that the minimum retention date has passed; and permanently delete all of the electronic records in the private data repository.

15. The computer system of claim 10 wherein said program instructions further: construct a private data directory for the selected consumer wherein the private data directory includes an entry for the individual which provides through a directory interface both access to the private data repository and a communications link between the selected consumer and the individual; and maintain the communications link after prohibiting access.

16. The computer system of claim 15 wherein the private data directory interface provides an indication to the selected consumer that the individual has deactivated access rights granted to the selected consumer.

* * * * *